(12) United States Patent
Hoppe et al.

(10) Patent No.: US 8,204,338 B2
(45) Date of Patent: Jun. 19, 2012

(54) FACTORING REPEATED CONTENT WITHIN AND AMONG IMAGES

(75) Inventors: Hugues H Hoppe, Redmond, WA (US); Yonatan Wexler, Redmond, WA (US); Eyal Ofek, Redmond, WA (US); Huamin Wang, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 12/031,221

(22) Filed: Feb. 14, 2008

(65) Prior Publication Data

US 2009/0208110 A1 Aug. 20, 2009

(51) Int. Cl.
*G06K 9/36* (2006.01)
*G06T 7/40* (2006.01)

(52) U.S. Cl. .................. 382/276; 382/278; 345/582

(58) Field of Classification Search .................. None
See application file for complete search history.

(56) References Cited

U.S. PATENT DOCUMENTS

| | | | |
|---|---|---|---|
| 4,651,341 A | 3/1987 | Nakashima et al. | |
| 5,778,373 A | 7/1998 | Levy et al. | |
| 5,844,573 A | 12/1998 | Poggio et al. | |
| 5,872,867 A | 2/1999 | Bergen | |
| 6,762,769 B2 | 7/2004 | Guo et al. | |
| 7,023,447 B2 | 4/2006 | Luo et al. | |
| 7,283,684 B1 | 10/2007 | Keenan | |
| 7,729,531 B2 * | 6/2010 | Winn et al. | 382/155 |
| 2004/0008214 A1 | 1/2004 | O'Neill et al. | |
| 2005/0088440 A1 | 4/2005 | Sloan et al. | |
| 2006/0104542 A1 | 5/2006 | Blake et al. | |
| 2007/0201558 A1 | 8/2007 | Xu et al. | |
| 2008/0310755 A1 * | 12/2008 | Jojic et al. | 382/278 |

FOREIGN PATENT DOCUMENTS

| | | |
|---|---|---|
| JP | 5037791 (A) | 2/1993 |
| KR | 100201336 (B1) | 6/1999 |

OTHER PUBLICATIONS

Y Liu, et al. "Near-regular texture analysis and manipulation", ACM SIGGRAPH 2004.*
B. Lévy, et al. "Least squares conformal maps for automatic texture atlas generation", ACM SIGGRAPH 2002.*
N. Ahuja et al. "Extracting texels in 2.1D natural textures", IEEE ICCV 2007.*
Stephen Brooks, Neil Dodgson, "Self-similarity based texture editing", ACM SIGGRAPH 2002.*
David J. Heeger, et al. Pyramid-Based Texture Analysis/Synthesis http://citeseer.ist.psu.edu/cache/papers/cs/5487/http:zSzzSzwhite.stanford.eduzSz~heegerzSzftpzSzpreprintszSzsiggraph95zSzmain.pdf/heeger95pyramidbased.pdf. Last accessed Nov. 15, 2007, 7 pages.

(Continued)

*Primary Examiner* — Li Liu
(74) *Attorney, Agent, or Firm* — Lee & Hayes, PLLC

(57) ABSTRACT

Systems and/or methods that factor large-scale repeated content within and/or among images can include devices and components that factor received or acquired images into epitomes that include all the content of the received or acquired images and transform maps that encode how to construct a facsimile or a close approximation of the image by selecting transformed regions from the epitomes. Through use of both the epitomes and the transform maps in conjunction, a facsimile or a close approximation of the input image can be reconstructed and displayed.

11 Claims, 13 Drawing Sheets

OTHER PUBLICATIONS

Vincent Cheung, et al. Video epitomes. Presented at CVPR 2005. In Proceedings of the IEEE Conference on Computer Vision and Pattern Recognition, IEEE Computer Society Press, Los Alamitos, CA, Jun. 2005. http://www.psi.toronto.edu/pubs/2005/VideoEpitome-CVPR05.pdf. Last accessed Nov. 15, 2007, 8 pages.

Qing Wu, et al. Feature Matching and Deformation for Texture Synthesis. In the ACM SIGGRAPH 2004 conference proceedings. http://citeseer.ist.psu.edu/cache/papers/cs2/262/http:zSzzSzwww-sal.cs.uiuc.eduzSz~yyzzSzpublicationzSztexsyn.pdf/wu04feature.pdf. Last accessed Nov. 15, 2007, 4 pages.

Sylvain Lefebvre, et al. Appearance-Space Texture Synthesis http://research.microsoft.com/~hoppe/apptexsyn.pdf. Last accessed Nov. 15, 2007, 8 pages.

Thomas Leung, et al. Detecting, Localizing and Grouping Repeated Scene Elements From an Image. Fourth Euro. Conf. on Computer Vision, Cambridge, England, Apr. 1996. http://citeseer.ist.psu.edu/cache/papers/cs/909/http:zSzzSzwww.cs.berkeley.eduzSz~leungtzSzResearchzSzECCV96_final.pdf/leung96detecting.pdf. Last accessed Nov. 15, 2007, 10 pages.

Cuntoor, et al., "Epitomic Representation of Human Activities", CVPR 2007, IEEE Conference on Computer Vision and Patter Recognition, Jun. 18, 2007, pp. 1-8.

European Extended Search Report mailed Jul. 5, 2011 for European patent application No. 09710048.1, 13 pgs.

Jojic, et al., "Epitomic Analysis of Appearance and Shape", Proceedings of the Eighth IEEE International Conference on Computer Vision (ICCV), Nice, France, vol. 1, Oct. 13, 2003, 8 pgs.

Kannan, et al., "Clustering Appearance and Shape by Learning Jigsaws", Advances in Neural Information Processing Systems, Vancouver, Cananda, vol. 19, Dec. 4-9, 2006, 8 pgs.

Lowe, "Distinctive Image Features from Scale-Invariant Keypoints", International Journal of Computer Vision, vol. 60, No. 2, Nov. 1, 2004, pp. 91-110.

Shi, et al., "Good Features to Track", IEEE Computer Society Conference on Computer Vision and Pattern Recognition, Proceedings, Jun. 21, 1994, pp. 593-600.

European Office Action mailed Feb. 28, 2012 for European patent application No. 09710048.1, a counterpart foreign application of U.S. Appl. No. 12/031,221, 8 pages.

Igarashi, et al., "Adaptive Unwrapping for Interacive Texture Painting", Proceedings of the the 2001 Symposium on Interactive 3D Graphics, Research Triangle Park, NC, Mar. 19-21, 2001, pp. 209-216.

* cited by examiner

FACTORING REPEATED CONTENT WITHIN AND AMONG IMAGES

BACKGROUND

Computer systems and related technologies such as the Internet have transformed modern society. This has become even more apparent as digital image/video technologies have become dominant—in business, on the Internet and in the home. In many homes for example, digital technologies such as DVD and digital cameras have replaced older analog technologies. As the Internet has exploded in popularity, digital images and moving pictures are routinely transmitted countless times per day. As these technologies have increased in popularity however, technical challenges relating thereto still remain. Stored digital images often times require storing/transmitting large amounts of data in order to reproduce a desired image or in the case of video, a desired sequence of images. In the case of the Internet for example, transmitting large amounts of data reduces network efficiency/speed and increases user frustration in relation to delays waiting for requested data. Thus, systems designers and architects have developed digital compression systems to reduce data storage and transmission requirements associated with digitized images.

Many conventional compression systems, however, provide the quantized coefficients to the encoder by scanning the coefficients in predictable, if not well-known, patterns (e.g., repeated horizontal scans starting from the same side of a plurality of coefficients stored in groups). Unfortunately, these types of scanning patterns may not enable efficient compression within the encoder since the scanning pattern may affect correlation between coefficient groups, and the efficiency of the encoder (e.g., longer vs. shorter runs of encoding sequences).

In relation to compression of images, redundant image features (e.g. long runs of a similar color) are often exploited to enable reduction of stored data. A common characteristic of many images is that neighboring pixels are correlated and therefore contain redundant information. Thus, an image compression objective is to determine a less correlated representation of the image. As an example, this objective may be achieved via redundancy and irrelevancy reduction. Redundancy reduction is directed at removing duplication from a signal source such as image and/or video, whereas irrelevancy reduction omits/filters parts of the image that may not be noticed and/or perceived by humans. In general, three types of redundancy may be identified: Spatial Redundancy or correlation between neighboring pixel values, Spectral Redundancy or correlation between different color planes or spectral bands, and Temporal Redundancy or correlation between adjacent frames in a sequence of images (e.g., video applications).

Image compression generally attempts to reduce the number of bits needed to represent an image by removing the spatial and spectral redundancies as much as possible. One popular image compression technology has been the Joint Photographic Experts Group (JPEG) standard. While JPEG is still employed in many applications, performance of coders based on this standard generally degrade at low bit rates mainly due to an underlying block-based Discrete Cosine Transform (DCT) scheme. More recently however, wavelet transform based coding has emerged in the field of image compression. According to wavelet-based technologies, image pixels are linearly transformed into a domain of wavelet coefficients via a discrete wavelet transform, for example. The wavelet coefficients may then be quantized wherein the number of bits required to store the transformed coefficients are reduced by reducing the precision of the coefficients, thus providing compression of the transformed data. The quantized data may then be scanned by an encoder (e.g., run-length encoder), wherein further compression may be achieved.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

Texture images typically and often contain repeated patterns. The subject matter as claimed in accordance with an aspect can factor such content by creating a condensed epitome (e.g., a condensed digital representation of ordered data sets, such as matrices representing images, audio signals, videos, or genetic sequences; epitomes typically contain many of the smaller overlapping parts of the data with much less repetition and with some level of generalization) such that all image blocks can be reconstructed from transformed epitome regions. Generally, the per-block transform map employed to reconstruct an image from epitome regions can include any defined deformation including, but not limited to, affine deformation and/or color scaling to account for perspective and shading variation across the image. The epitome content itself is nevertheless still amenable to traditional image compression, and further allows for new mode progressivity, whereby generic features typically appear before unique detail, for example. Moreover, the same or a similar factoring approach can also be effective across collections of images, particularly in the context of image-based rendering.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
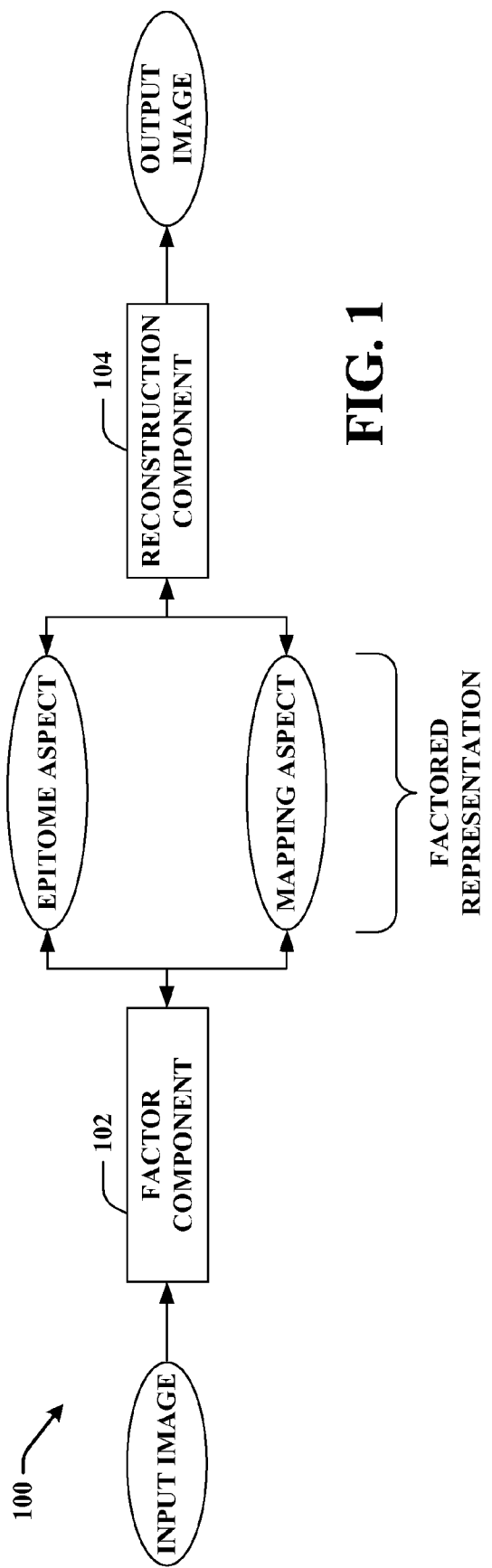
FIG. 1 illustrates a machine-implemented system that factors large-scale repeated content within and/or among images in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

Textures often contain repeated patterns such as bricks, tiles, windows, and the like. Existing image compression schemes are largely unable to exploit these repeated patterns. For example, schemes such as those from the Joint Photographic Experts Group (JPEG) perform entropy coding on frequency coefficients within small (e.g., 8×8 pixel) image blocks. Although wavelet-based schemes can typically consider a hierarchy over the whole image, these schemes generally do not detect correlation of high-frequency features across non local neighborhoods. Moreover, while existing codebook techniques such as, for example, vector quantization can efficiently encode duplicate image blocks; such duplication generally only arises where the 2D period of the repeating image content aligns precisely with the block size—an exceedingly rare circumstance in practice.

In accordance with an aspect of the claimed subject matter a new representation capable of efficiently factoring large-scale repeated image content is presented. The repeated content can typically have arbitrary periodicity (even a fractional number of pixels), and in general need not lie on a regular lattice. In general terms, the claimed subject matter factors a given image I into an epitome E and a transform map $\phi$. Intuitively, the epitome encapsulates all the content in the original image, and the transform map encodes how to reconstruct the image by selecting transformed regions of the epitome. More precisely, the image is typically divided into a regular grid of blocks, and each block (e.g., s×s pixels) can be reconstructed by an epitome patch. For example, in the simplest scheme, the epitome patch can be determined by a translation vector t stored as $\phi_t$, and the reconstructed image can be rendered by I'[p]=E[p+$\phi_t$[[p/s]]], where I' is the reconstructed image and p is the pixel at issue. Generally, access to epitome E utilizes filtered (e.g., bilinear) sampling, while the access to transform map $\phi$ typically employs nearest sampling, for example.

In reference to the foregoing, it should be noted that the translation vectors $\phi_t$ can have finer resolution than block granularity; in fact they can have sub-pixel precision. Accordingly, the claimed subject matter generally does not form a simple dictionary of blocks as can be typical in vector quantization schemes. Rather, the extracted blocks can in many instances overlap arbitrarily on the epitome E.

As will be intuitively appreciated, the goal of the claimed subject matter is to introduce "sufficient content" into the epitome E such that all blocks of the original image are well approximated by some translated versions within epitome E.

One distinction of the claimed subject matter over existing techniques is the fact that the claimed subject matter generally need only capture the blocks of the original image, rather than the neighborhoods of all pixels. More importantly, the claimed subject matter can create a compact transform map $\phi$: I→E from the image to the epitome to allow (e.g., lossy) reconstruction of the original image. While some earlier epitome schemes have also explored such mapping techniques, at the fine resolution of image pixels these schemes have generally not been as effectual at enabling a concise factoring to parallel that exposited by the claimed subject matter.

If the original image is an exact tiling with period τ×τ, then all its blocks can typically be reconstructed from an epitome chart whose size is s⌈τ/s⌉×s⌈τ/s⌉. More importantly, several repeated patterns (e.g., like multiple building facades) with different periodicities can be encoded as separate charts within the same epitome factoring. Representing multiple repeating patterns efficiently within the same texture can be advantageous as it can eliminate costly changes in runtime render state.

Moreover, for robustness to perspective view distortion, the subject matter as claimed can generalize the transform map $\phi$ to include affine deformations. Additionally and/or optionally, the claimed subject matter can provide a low-resolution color scaling map that improves factoring in the presence of lighting variations (e.g., low-frequency) commonly found in real-world photographs.

Accordingly, the benefits of the claimed subject matter are many and manifest, and include the fact that the factored representation (e.g., $\phi$,E) supports efficient random access such that color evaluation can be directly appraised at any point without expanding the data to a temporary memory buffer. Image compression can be applied to the epitome to exploit its fine-scale coherence. In particular and in accordance with an aspect, the claimed subject matter can be viewed as an orthogonal front-end that can exploit the repetition of larger-scale content not usually discovered by traditional compression. Further, the transform map $\phi$ utilized by the claimed subject matter can itself be highly predictable in regions with either unique or repeating content, and thus offers further opportunities for compression. Additionally, like earlier block indirection schemes, the claimed subject matter can encode large image regions of constant or undefined color very effectively while preserving random access. Moreover, the epitome can have nested structure to offer a new mode of progressivity at the level of texture features, whereby generic features are transmitted before specific ones. Unlike the course-to-fine or bit-sliced progressivity provided by most other image compression techniques, the subject matter as claimed quickly recovers a full-resolution detailed image, albeit infrequently with fewer unique features.

Further, while reconstructed image blocks may not initially match exactly along their boundaries, the claimed subject matter nevertheless is capable of reducing resulting blocking artifacts through use of an interpolation technique in the pixel shader evaluation. Moreover, while filtered minification using an epitome mipmap can introduce color bleeding between epitome charts, just as in surface texture atlases, for example, the subject matter as claimed in contrast can reduce this artifact by padding the charts with gutter regions, for instance.

In addition, the claimed subject matter can apply factoring to content shared by a collection of images, a capability especially appropriate for image-based rendering approaches that store multiple photographs of the same scene from different viewpoints, for example. Additionally, the claimed subject matter can find applicability in other contexts where multiple images, such as videos or motion field videos, utilize sequences of images. While some content in such applications can be unique to each image, for instance due to disocclusion, large portions of the scene can nevertheless appear in two or more images and can therefore be factored accordingly.

Prior to embarking on an extensive discussion of the claimed subject matter, description of some generalizations of the basic representation and discussion of the encoding of the transform map are presented below.

In many cases, the repeated elements of the input image I are not identical translated copies of each other. For example, in a picture of a tiled floor viewed obliquely, the tiles undergo perspective foreshortening as they approach the horizon in the picture. To account for this, the claimed subject matter can redefine the transform map to encode local affine deformations. Accordingly, for each block a matrix D that maps any image point $p=(x\ y\ 1)^\tau$ to position, $D_p$ in the epitome can be employed. The reconstructed image (I') is therefore $I'[p]=E[\phi_D[p/s]p]$. As before, this affine deformation map $\phi_D$ is piecewise constant over each image block.

The epitome will typically contain the large-scale versions of the features, while the foreshortened versions are minified instances. Thus an image block near a foreshortened feature is mapped by $\phi_D$ to some quadrilateral region in E. Matrix D could nevertheless be a perspective deformation, however it has been found that affine deformations, without limitation or disclaimer, typically form a sufficiently accurate local approximation.

Repeated image elements may also differ due to low-frequency lighting variations over the image. In the above tiled floor example, there may be smooth color variations across the floor due to non-uniform overhead lighting. Also, photographs in image collections can vary due to different exposure or white-balance parameters. In order to account for these variations, the claimed subject matter can factor out these lighting variations by introducing a color scaling function, denoted by a diagonal matrix L. The transform map then becomes the tuple $\phi=(\phi_D, \phi_L)$, such that $I'[p]=E[\phi_D[p/s]p]\phi_L[p]$.

Although a 3-channel color scaling map $\phi_L$ can require additional storage, this increase can be more than offset by improved factoring of the lighting-normalized image $I[p]/\phi_L[p]$. The claimed subject matter can store $\phi_L$ as a per-block constant, accessed with nearest sampling like $\phi_D$.

For storage efficiency the claimed subject matter can quantize the coefficients stored in $\phi$. It has been found that 16-bit fixed point numbers, without limitation or disclaimer, are generally sufficient for the two translation coefficients, however as will be appreciated by those cognizant in this field of endeavor, other number representations (e.g., integer, floating point, and the like) can be employed with equal effectiveness. For example, with 3 fractional bits, this can provide 0.125 sub-pixel positioning of the transformed blocks while allowing access to an epitome E up to size $(8K)^2$. If, for instance, the transform includes affine deformations, the claimed subject matter can store the 4 additional vector coefficients as 8-bit integers. In total these coefficients require 64 bits/block or only 0.25 bits/pixel with a block size of $s^2=16^2$. Similarly, the claimed subject matter can, for example, quantize the color scaling map $\phi_L$ to 8 bits/channel, thus using less than 0.1 bits/pixel.

FIG. 1 depicts a machine-implemented system 100 that factors large-scale repeated content within and among images. System 100 can include factor component 102 that receives or obtains images and/or image collections from one or more disparate sources (e.g., photographic collections, . . . ) and on receipt or acquisition of such images and/or image collections factor component 102 can segment, partition, apportion, subdivide, or section the image (I) into an epitome aspect (E) and a mapping aspect ($\phi$). Typically, the epitome aspect can include all the content in the original image, and the mapping aspect can encode how to reconstruct the image by selecting transformed regions of the epitome aspect. In particular, factor component 102 on receipt or acquisition of the image can divide the image into regular grid blocks, and for each grid block (e.g., s×s pixels) reconstruct an epitome patch. For instance, factor component 102 can determine the epitome patch by utilizing a translation vector t that can be stored as $\phi_t$, wherein the reconstructed image can be $I'[p]=E[p+\phi_t[\lfloor p/s\rfloor]]$ and access to epitome aspect (E) can employ filtered sampling, while access to mapping aspect ($\phi$) can use nearest sampling. It should be noted that the translation vectors $\phi_t$ can typically have finer resolution than block granularity; in fact, they can have sub-pixel precision. Thus, factor component 102 does not form a simple directory of blocks as is the case in vector quantization schemes. Rather, the extracted blocks can overlap arbitrarily in the epitome E.

Additionally, system 100 can also include reconstruction component 104 that can, for example, receive the output from factor component 102 (e.g., epitome aspect (E) and/or mapping aspect ($\phi$)), and thereafter in accordance with an illustrative aspect of the claimed subject, and as will be discussed in more detail infra, employ the factored representation (e.g., epitome aspect (E) and/or mapping aspect ($\phi$)) in the context of textured mapping to produce an output image. In a further illustrative aspect reconstruction component 104 can effectuate progressive representation by creating a nested epitome structure to represent increasingly accurate approximations of a given image—a scalable level-of-detail representation. Moreover, in a further illustrative aspect reconstruction component 104 can factor image collections to allow for navigation within a scene using a set of photos taken from several viewpoints.

Figure 2:
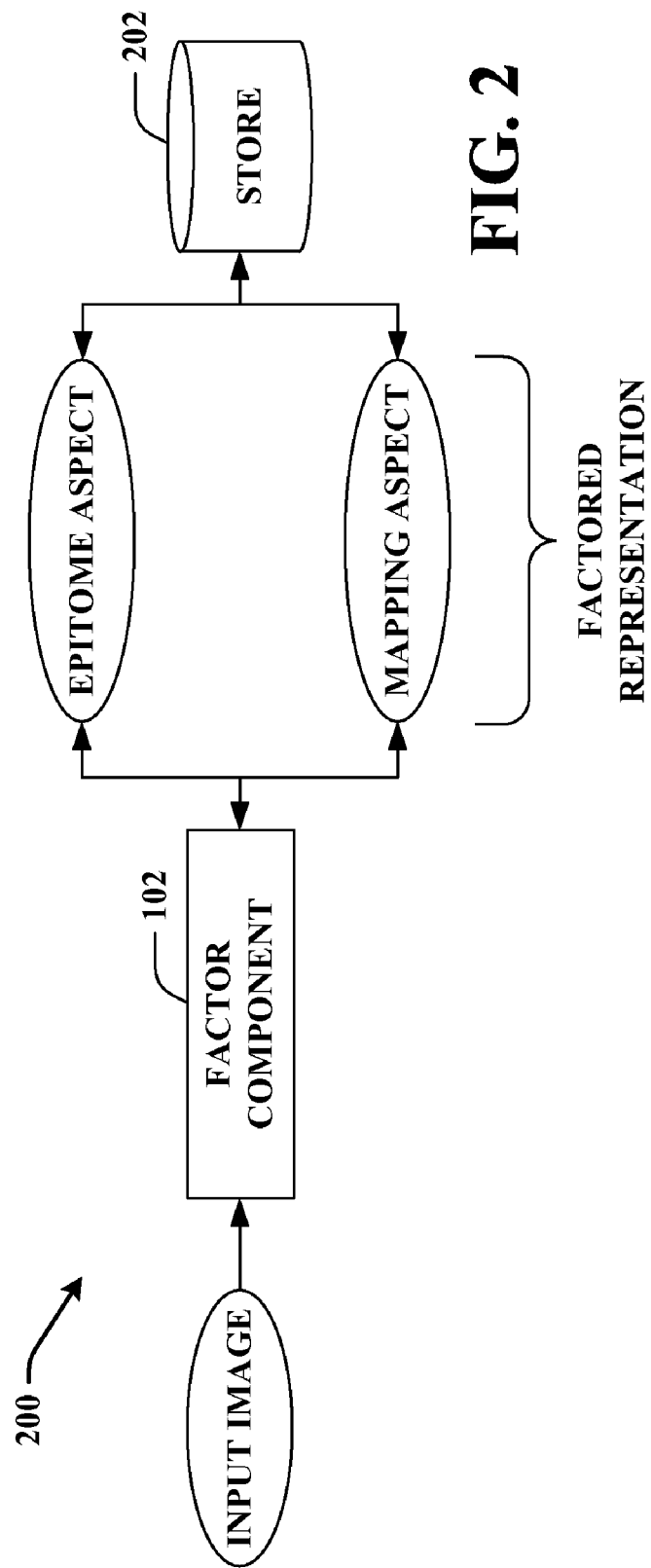
FIG. 2 depicts a machine-implemented system that factors repeated content within and among images and image collections in accordance with an aspect of the claimed subject matter.

FIG. 2 provides illustration of a system 200 that facilitates factoring of repeated content within and among images and/or image collections in accordance with an aspect of the claimed subject matter. As depicted system 200 can include factor component 102 that receives and/or retrieves images and/or image collections from disparate sources and on receipt or retrieval of such images and/or image collections can divide, partition, or segment the image (I) into an epitome aspect (E) and a mapping aspect ($\phi$), as outlined supra. Since the functionality and/or features of factor component 102 can be the same or similar to those exposited in connection with FIG. 1, a detailed description of such functionality and/or features has been omitted for the sake of brevity. Accordingly, system 200 can also include store 202 to which factor component 102 can direct the generated epitome and mapping aspects for temporary and/or permanent persistence.

Store 202 can further include or have persisted thereon any suitable data necessary for factor component 102 to facilitate its aims. For instance, store 202 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, etc.

It is to be appreciated that store 202 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 202 of the subject systems and methods is intended to comprise, without being limited to, these and any other suitable types of memory. In addition, it is to be appreciated that store 202 can be a server, a database, a hard drive, and the like.

Moreover, it should be noted that factor component 102 and store 202 can reside on two disparate segments of a network topology (not shown). The network topology can include any viable communication and/or broadcast technology, for example, wired and/or wireless modalities and/or technologies can be utilized to effectuate the claimed subject matter. Moreover, the network topology can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof.

Figure 3:
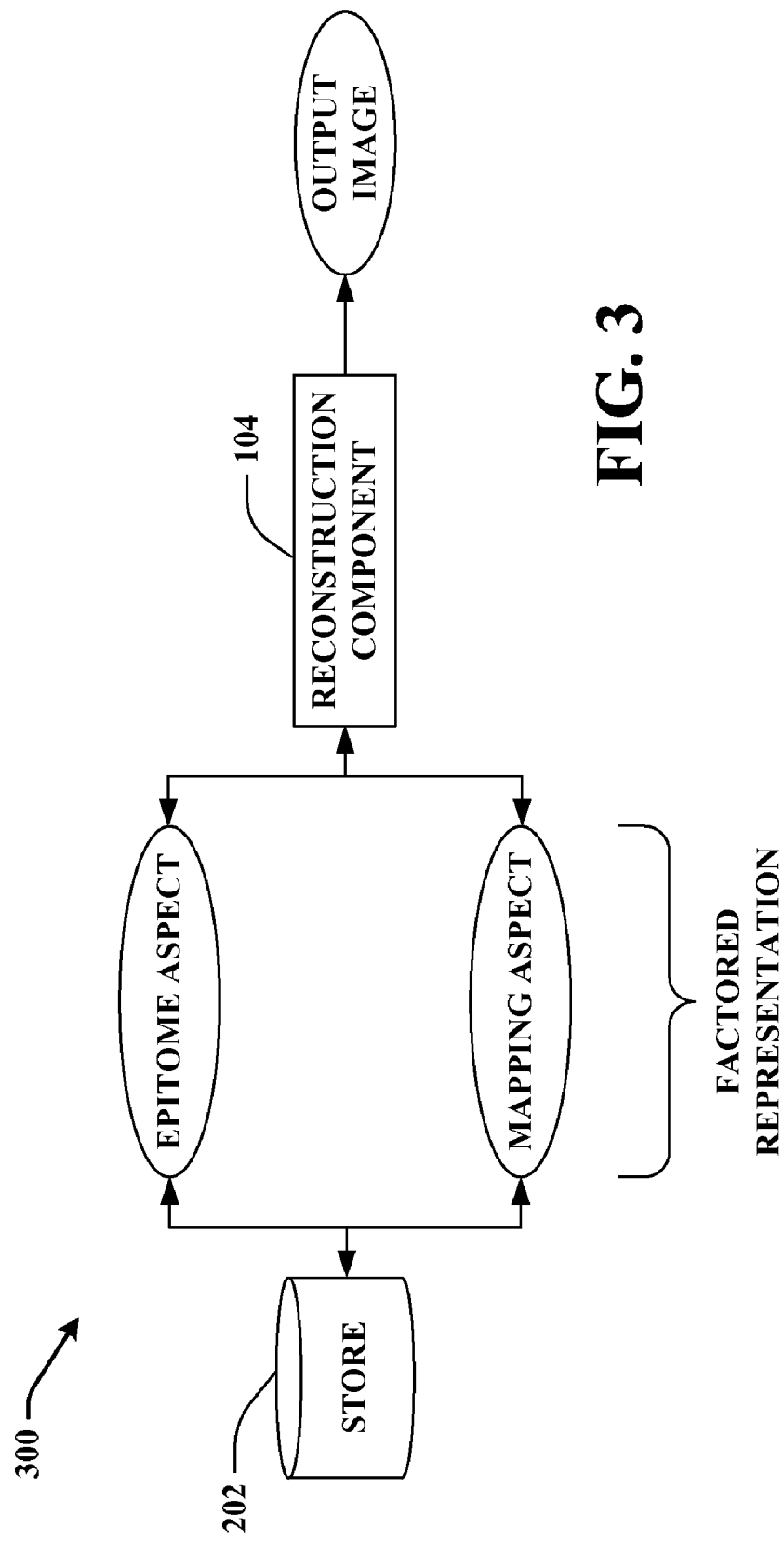
FIG. 3 depicts a further machine-implemented system that factors repeated content within and among images and image collections in accordance with an aspect of the claimed subject matter.

FIG. 3 depicts system 300 implemented on a machine that effectuates factoring of repeated content within and among large-scale images and/or image collections in accordance with an aspect of the claimed subject matter. As illustrated system 300 can include reconstruction component 104 that employs the factored representation (e.g., epitome aspect (E) and mapping aspect ($\phi$)) persisted on, and/or retrieved or acquired from, store 202 in the context of 3D rendering (e.g., output image) in accordance with an aspect of the claimed subject matter. Reconstruction component 104 accomplishes such 3D rendering by enabling texture minification to prevent aliasing; and obtaining continuous reconstruction across block boundaries, for example.

Additionally, in accordance with a further aspect, reconstruction component 104 can facilitate compression of the factored representation (e.g., both the epitome aspect (E) and the mapping aspect ($\phi$)). Reconstruction component 104 can employ a variety of techniques, such as one or more of a group of image compression algorithms (e.g., DXT1, DXT2, DXT3, DXT4, DXT5) for random-access rendering, and/or Portable Network Graphics (PNG) file format or Joint Photographic Experts Group (JPEG) compression for sequential storage of the epitome aspect (E). Additionally, the mapping aspect ($\phi$) generally compresses well due to its coherence. Thus, if adjacent image blocks access adjacent content in the epitome aspect (E), their associated translation vector $\phi_t$ can be identical (e.g., $\nabla \phi_t = 0$). With repeating content, adjacent translation vectors often differ by a small multiple (typically 0 or −1) of the tiling period. Consequently, a simple illustrative strategy for sequential compression can be to compute successive differences for each of the transform coefficients and apply entropy coding.

In accordance with yet a further aspect, reconstruction component 104 can facilitate and/or effectuate progressive representation wherein nested epitome structures to represent increasingly accurate and more detailed approximations of a given image (e.g., a scalable level-of-detail representation) can be created. For instance, a rough approximation $I_1$ of image I can be obtained by reconstruction component 104 through use of a small epitome image $E_1$ and an initial transform map $\phi_1$. Then a more accurate approximation $I_2$ of the same image can be obtained by adding more image content to form a larger epitome image $E_2$ together with a new transform map $\phi_2$. Reconstruction component 104 can then ensure that content in the larger epitome image $E_2$ comprises a superset of the content in image $I_1$, so that only differences between the rough approximation or smaller epitome image and the larger epitome image (e.g., $E_2 \backslash E_1$) need be stored or transmitted. Although the transform maps $\phi_1$ and $\phi_2$ can differ, many of the blocks in the larger epitome image $E_2$ can still nevertheless refer to content in the smaller epitome image $E_1$ and therefore their block transforms in the new transform map (e.g., $\phi_2$) associated with the larger epitome image $E_2$ can be predicted from those contained in the transform map (e.g., $\phi_1$) associated with the smaller epitome image $E_1$ to allow for effective compression.

Figure 4:
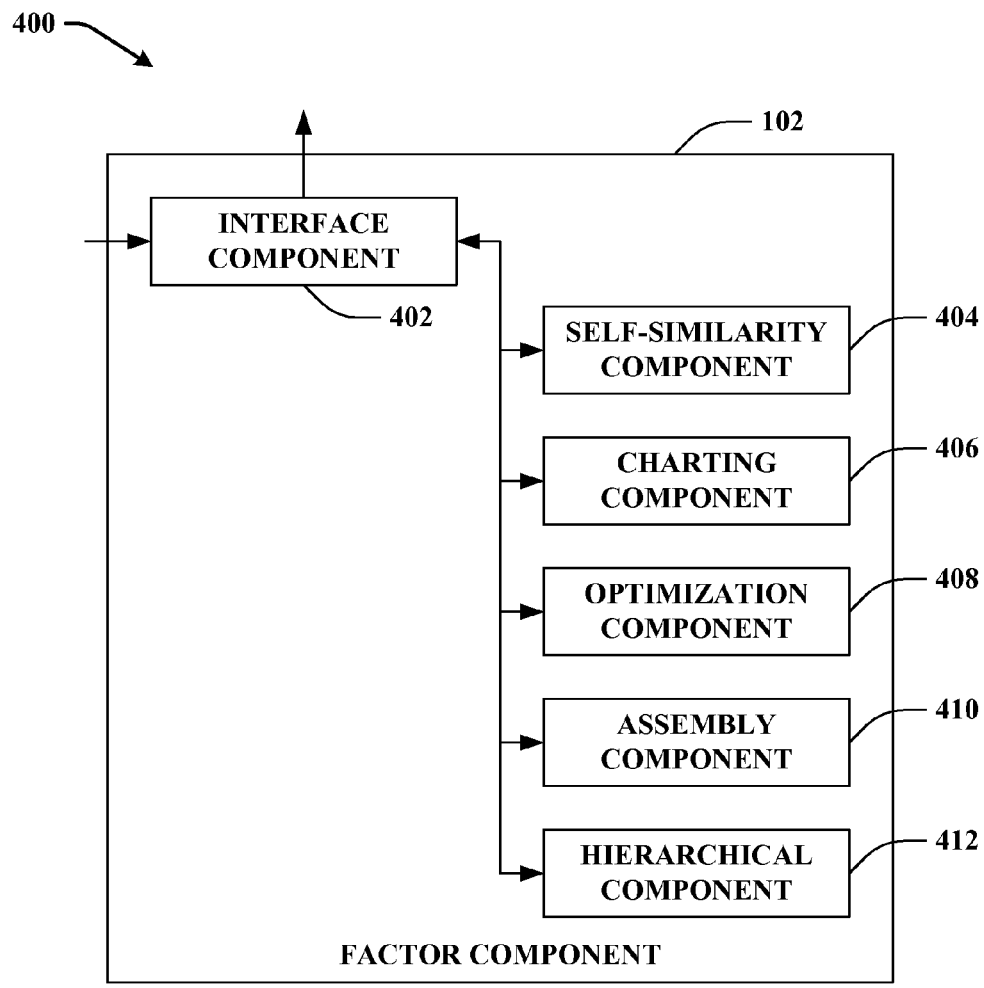
FIG. 4 provides a more detailed depiction of a factor component in accordance with an aspect of the claimed subject matter FIG. 5 provides more detailed illustration of a reconstruction component in accordance with an aspect of the claimed subject matter.

FIG. 4 provides a more detailed depiction 400 of factor component 102 in accordance with an aspect of the claimed subject matter. As illustrated, factor component 102 can include interface component 402 (hereinafter referred to as "interface 402") that can receive and/or disseminate, communicate, and/or partake in data interchange with a plurality of disparate sources and/or components. For example, interface 402 can receive and transmit data from, and to, a multitude of sources, such as, for instance, data associated with image compression, texture mapping, progressive representations, and/or information associated with factoring image collections. Additionally and/or alternatively, interface 402 can obtain and/or receive data associated with user names and/or passwords, sets of encryption and/or decryption keys, client applications, services, users, clients, devices, and/or entities involved with a particular transaction, portions of transactions, and thereafter can convey the received or otherwise acquired information to one or more of self-similarity component 404, charting component 406, optimization component 408, assembly component 410, and/or hierarchical component 412, for subsequent utilization, processing, and/or analysis. To facilitate its ends, interface 402 can provide various adapters, connectors, channels, communication pathways, etc. to integrate the various components included in system 400 into virtually any operating system and/or database system and/or with one another. Additionally and/or alternatively, interface 402 can provide various adapters, connectors, channels, communication modalities, and the like, that can provide for interaction with various components that can comprise system 400, and/or any other component (external and/or internal), data, and the like, associated with system 400.

Solely for purposes of the following discussion and simplicity of exposition, rather than limitation, let it be assumed that the input image I is square with size n×n. Then, with a block size s×s, the transform map φ typically can be sized and represented as ⌈n/s⌉×⌈n/s⌉.

With the understanding that a goal to be achieved by the claimed subject matter is that the factored representation needs to be both accurate and concise. In order to achieve this objective, factor component 102 needs to minimize the size of the two stored textures, |E|+|φ|, as well as the image approximation error $\mu I'-I\|^2$ which can be expressed mathematically as:

$$\min_{s,E,\phi} \lambda(|E|+|\phi|)+\Sigma\|E[\phi_D[p/s]p]\phi_L[p]-I[p]\|^2$$

where the parameter λ provides a tradeoff between accuracy and conciseness.

If conciseness is ignored (e.g., λ=0) a lossless representation can be achieved by letting the epitome E equal the input image I, and letting the transform map be an image containing an identity transform. Thus, a lossless representation is possible with negligible storage overhead. For extreme conciseness (e.g., λ→∞), in contrast, the epitome E can be reduced to an image containing the mean pixel color of the image I, with the transform map again as an image. Thus, aggressive compression is also achievable through use of the claimed subject matter, and in particular, utilization of factor component 102. Nevertheless, as will be appreciated the more interesting and practical instances do not reside at the extremes, but rather at intermediate values of λ, where the representation can hope to factor some repeated image content to form a smaller epitome, but usually at the cost of some approximation error in the reconstructed image.

In order to make the problem of constructing a factored image representation more tractable, factor component 102 can select a block size s so that |φ| is fixed. And rather than minimizing the function with parameter λ, factor component 102 can utilize a maximum approximation error ϵ that typically must be satisfied for each image block, and thereafter seek the most concise representation that achieves that error threshold. This can be denoted as follows.

Let e(B) denote the approximation error of a given image block:

$$e(B) = \frac{\sum_{p \in B} \|I'[p] - I[p]\|^2}{\sigma(I_B)^\alpha + \varepsilon}. \quad (1)$$

Note that the representation I' can include color scaling such that $$\sum_{p \in B} I'[p] = \sum_{p \in B} I[p].$$

The variance σ($I_B$) of the source block can be introduced in the denominator (with an exponent 1≦α≦2) as a perceptual factor to better preserve low contrast features in relatively smooth regions. Accordingly, factor component 102 can seek to minimize the following function: $\min_{E,\phi}|E|$ such that ∀B⊄I,e(B)≦ϵ, by utilizing a greedy construction process, for example, that grows epitome charts extracted from the input image. Typically each epitome chart can be a connected set of the input blocks, and thus generally has the shape of a polyomino (e.g., a plane figure constructed by joining together identical basic polygons, such as a square, as its base form). The general strategy adopted by factor component 102 is therefore to maximize the number of new image blocks {B} ⊂ I that can be accurately reconstructed from the growing epitome, while minimizing epitome growth.

A basic approach that can be adopted by factor component 102 to achieve the foregoing can be to: find self-similarities in the image I; create an epitome chart for each repeated content; optimize the transform map φ; and assemble all epitome charts into an epitome atlas E. Accordingly, factor component 102 can include self-similarity component 404 that locates self-similarities where for each block in the input image self-similarity component 404 computes a set of all transformed regions (e.g., patches) in the image with similar content. For example, for block $B_i \not\subset I$ find the set (e.g., Match($B_i$)={$M_{i,0}$, $M_1$, . . . }) of transforms identifying patches of image I that approximate $B_i$ within tolerance ϵ. Each transform $M_{i,j}$=($D_{i,j}$, $L_{i,j}$) generally has an affine deformation and color scaling. Block $B_i$ is compared with $M_{i,j}(B_i)$ using equation (1) above.

Self-similarity component 404 can perform a match search (e.g., find the set of transforms identifying patches of image I that approximate $B_i$ with tolerance ϵ) using a Kanade-Lucas-Tomasi (KLT) tracking optimizer, which typically can solve for optimal affine alignment of two windows. Nevertheless, since the Kanade-Lucas-Tomasi (KLT) tracking optimizer is typically designed for small translations, rotations, and scalings, self-similarity component 404 needs to initialize the tracking optimizer with a good starting state. Accordingly, self-similarity component 404 can initialize separate Kanade-Lucas-Tomasi (KLT) searches at a grid of seed points spaced every s/4 pixels. Thereafter self-similarity component 404 can prune the search by considering seeds whose (pre-computed) neighborhood color histograms are similar to the queried block. For each candidate position $s_j$ self-similarity component 404 can compute the color scaling $L_{i,j}$ by dividing the mean colors of the two neighborhoods while constraining the color scaling coefficient, for example, to not exceed 1.25, to give preference to brighter image content and thereby avoid quantization errors in reconstruction.

Figure 10:
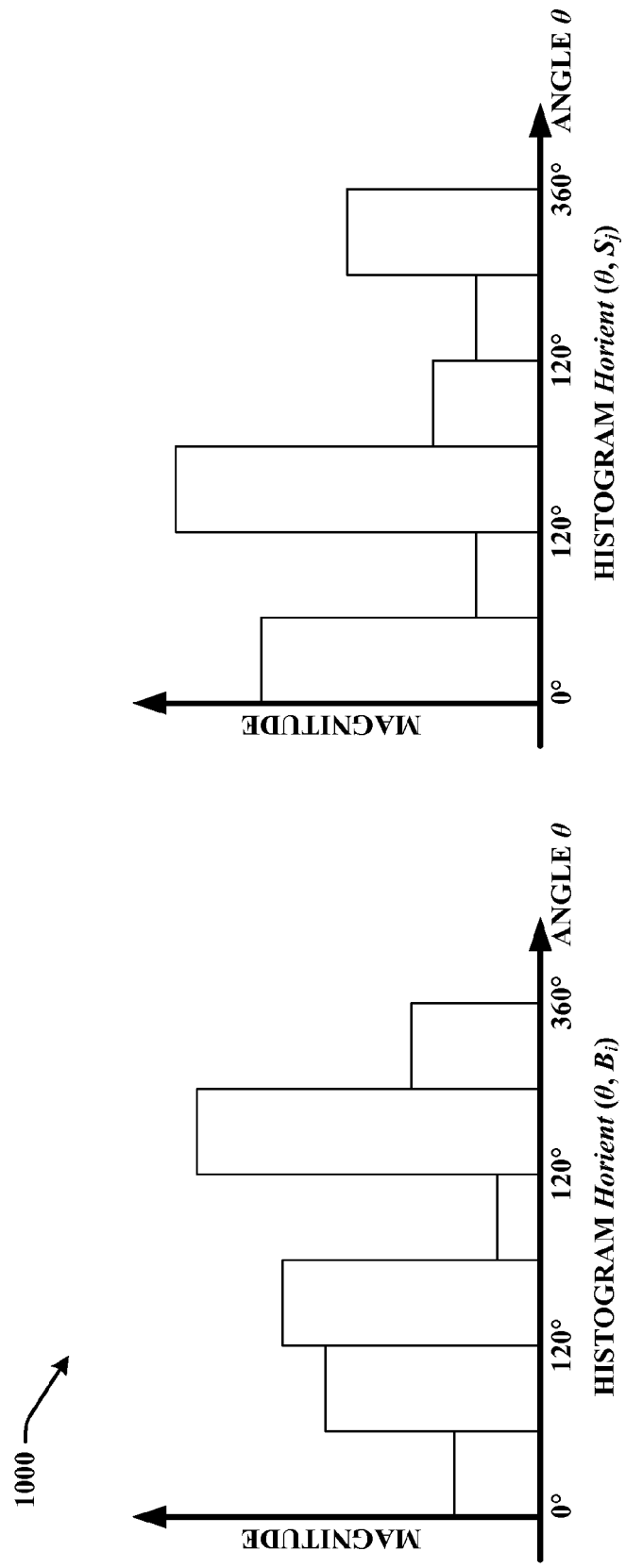
FIG. 10 depicts illustrative orientation histograms that can be utilized in accordance with an aspect of the subject matter as claimed.

Additionally, self-similarity component 404 can obtain a starting rotation angle $\theta_{guess}$ by comparing orientation histograms (see, FIG. 10 for illustrative orientation histograms that can be employed by self-similarity component 404) of the two neighborhoods:

$$\theta_{guess} = \underset{\theta'}{\arg\min} \sum_{\theta=0^\circ}^{360^\circ} (H_{orient}(\theta, B_i) - H_{orient}(\theta + \theta', s_j))^2.$$

Typically, each histogram can contain 36 buckets over the range 0-360 degrees; the value in each bucket can be the luminance gradient strength in that orientation integrated over the block. Orientation histograms can typically be pre-computed by self-similarity component 404 for all blocks $B_i$. Moreover, self-similarity component 404 can generally approximate the orientation histogram of $M_{i,j}(B_i)$ by that of the closest block.

Figure 11:
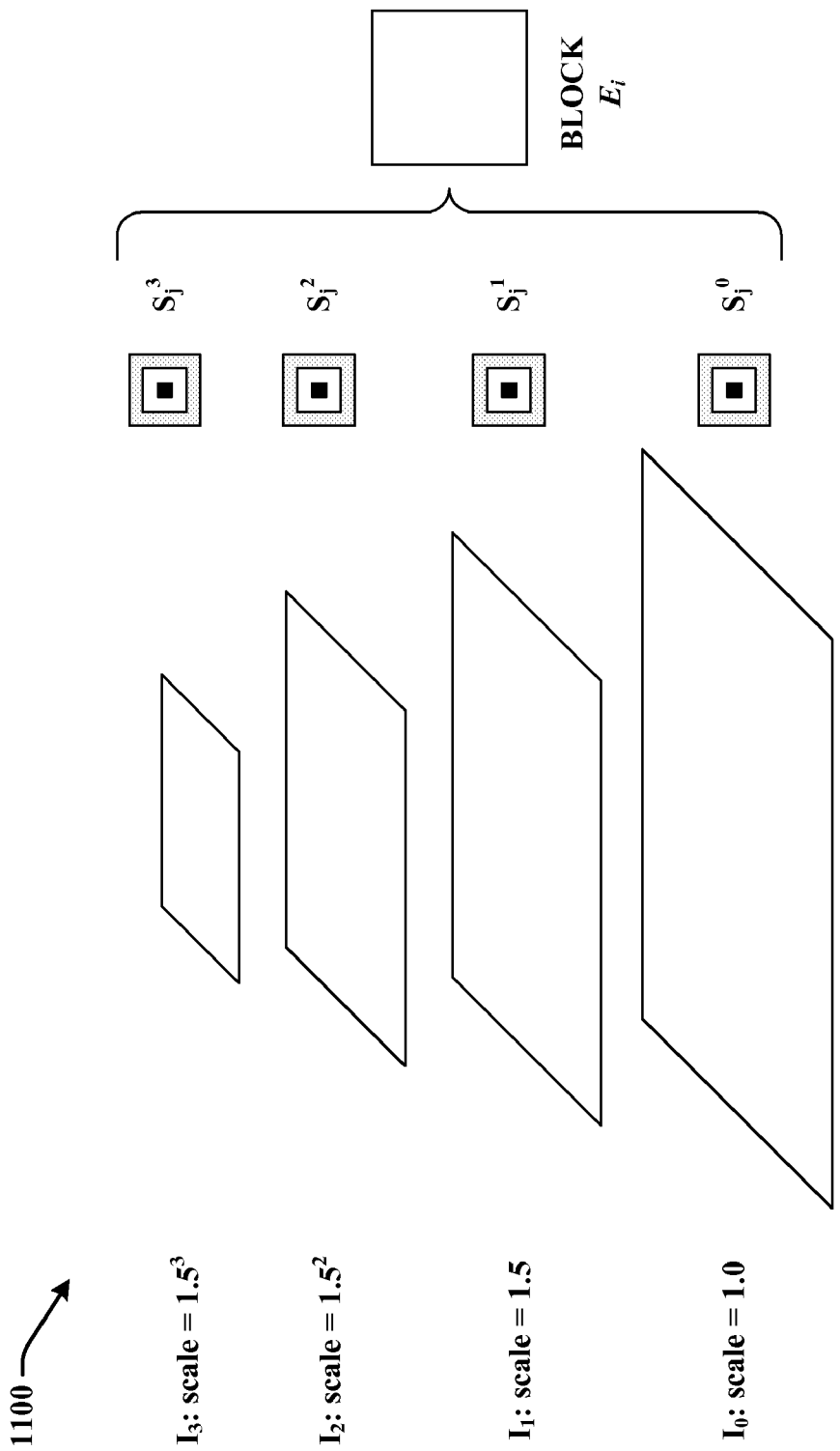
FIG. 11 depicts an illustrative image pyramid that can be utilized for scaling purposes in accordance with an aspect of the claimed subject matter.

Further, self-similarity component 404 can build an image pyramid (see FIG. 11 for an illustrative image pyramid utilized for scaling purposes) with sub-octave resolution, and perform separate searches in each pyramid level. It should be noted that the pyramid levels are typically minified (e.g., corresponding to matches that are magnified in the original image, to avoid blurring in the reconstruction).

Moreover, self-similarity component 404 can include a reflection aspect that can take into account mirror reflections since these can be represented by affine deformations generated by the claimed subject matter. Some image blocks can have an excessive number of matches. For instance, the sky in a photograph can often contain blocks that all match each other resulting in a clique of $O(n^2)$ complexity. To overcome this problem, self-similarity component 404 can define a separate relationship of equivalent blocks. If during the search for $Match(B_i)$, self-similarity component 404 finds another block $B_j$ that is nearly identical up to color scaling (e.g., with a tight tolerance and without deformation), self-similarity component 404 can tag $B_j$ to share the same match list as $B_i$.

Additionally, factor component 102 can include charting component 406 that can copy contiguous regions (called charts) from the input image into the epitome E, such that these charts can reconstruct other parts of the image. Charting component 406 can grow each chart in a greedy fashion, for example, trying to account for as many image blocks as possible. Each epitome growth step can generally add a region ΔE consisting of a set of blocks $\{B_i\} \subset I$. Accordingly, if $I^E \subset I$ denotes the subset of the image that can be accurately reconstructed by epitome E, then: $I^E = \{B \not\in I | e(B) \leq \epsilon\}$. Thus, charting component 406 needs to be able to add the region ΔE that maximizes the function $$Benefit(\Delta E) = |I^{E+\Delta E} \setminus I^E| - \Delta E|.$$

It should be noted that by letting the increment ΔE be a single image block would generally only match other image blocks that are strictly equivalent. Instead a somewhat larger region able to contain the transformed patches from many Match lists is typically required. Such a candidate region $C_j$ for each s×s epitome block $B_j$ can be found by charting component 406 in the following illustrative manner.

For example, charting component 406 can construct an inverse mapping $Cover(B_j)$ that can contain the set of image block $B_i$ whose matched patches overlap with $B_j$ such that $Cover(B_j) = \{M_{i,k}|M_{i,k}(B) \cap B_j \neq \emptyset\}$. Charting component 406 can then define or identify $C_j$ as the set of epitome blocks necessary to reconstruct all transformed blocks in $Cover(B_j)$ so that $$C_j = \{B | B \cap M_{i,k}(B_i) \neq \emptyset, M_{i,k} \not\in Cover(B_j)\}.$$

Charting component 406 can then isolate chart growth candidates as $(\Delta E)_j = C_{j \setminus E}$ for all blocks $B_j$ inside or adjacent to the current chart, or for all blocks $B_j$ in the whole image if starting a new chart. If charting component 406 is unable to find any additional ΔE for which $Benefit(\Delta E) \geq 0$, then charting component 406 can restart the chart growing process at a new location in the image.

Factor component 102 can further include optimization component 408. During the incremental growth of the epitome accomplished by charting component 406, each image block $B_i$ can be assigned to a first epitome location that approximates image block $B_i$ well (e.g., $M_{i,k}(B_i)$ for some $M_{i,k} \not\in Match(B_i)$. However, content subsequently added to the epitome may provide a better approximation of block $B_i$. Therefore, after epitome construction is completed, optimization component 408 can iterate through all image blocks $B_i$, determine the location in the epitome that offers the best reconstruction of $B_i$, and update the transform map φ accordingly:

$$\phi[B_i] = \underset{M \in Match(B_i), M(B_i) \subset E}{argmin} \|B_i - M(B_i)\|.$$

The quality of the reconstructed image can improve significantly as a result of such optimization as the optimization generally changes which content of the epitome is employed during reconstruction, so any unused content is removed by appropriately trimming blocks from the charts.

Further, factor component 102 can also include assembly component 410 that can pack charts together into an epitome atlas. The packing typically undertaken by assembly component 410 is generally related to surface texture atlas packing, and in particular, since in this instance the charts are polyominoes, the packing is a discrete problem (and NP-hard). Accordingly, assembly component 410 can employ the strategy of considering charts in order of decreasing size, and determining for each chart the optimal placement (including rotation and mirroring) that minimizes the growth in area of the bounding rectangle.

Additionally and/or alternatively, factor component 102 can include hierarchical component 412. For large images, the $O(n^2)$ time complexity of the matching search can be significant. As a speedup a hierarchical component 412 can be employed wherein the image can be partitioned into sub-images $\{I_i\}$, each sub-image can then be factored separately to obtain its epitome $E_i$, and then form their union $E = \cup_i E_i$. Hierarchical component 412 can then run the construction process with the full image I as input, but restrict the match search to the smaller image E. Because some epitome charts are redundant across the images, they can be trimmed away during optimization (e.g., by optimization component 408). A resultant epitome E can thus be obtained that is generally more compact than E. This aspect can have particular utility in the context of image collections.

Figure 5:
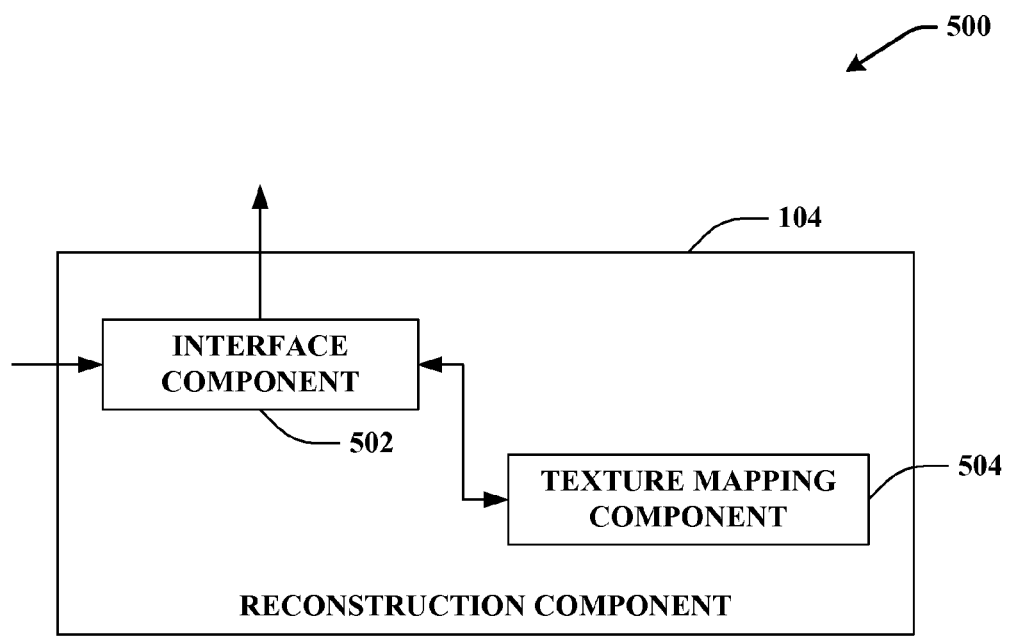

FIG. 5 provides more detailed illustration 500 of reconstruction component 104 in accordance with an aspect of the claimed subject matter. As illustrated reconstruction component 104 can include interface component 502 (hereinafter referred to as "interface 502") that can have similar functionality and features to that described in connection with interface component 402. Accordingly, because much of the configuration and operation of interface 502 is substantially similar to that described with respect to interface 402, a detailed description of such features and functionality has been omitted for the sake of brevity. Thus, according to the illustrated aspect reconstruction component 104 can further include texture mapping component 504 that can utilize the factored representations generated by factor component 102 and its various components, in the context of 3D rendering. In order to facilitate and effectuate such 3D renderings from the factored representations texture mapping component 504 enables texture minification to prevent aliasing and effectuates continuous reconstruction across block boundaries.

In order to achieve texture minification, texture mapping component 504 can utilize a mipmapping structure over the epitome texture. However, just as in a surface texture atlas, the epitome can consist of irregular charts, so the mipmap pyramid can inevitably contain coarser-level samples whose bilinear basis functions can span different charts, which can lead to color bleed in the reconstructed image. To circumvent this issue texture mapping component 504 can add a padding gutter (e.g., 4 pixels) between charts.

At very coarse minification, the access to the transform map ϕ can itself suffer from aliasing. To avoid this, texture mapping component 504 can persist a mipmap of a course version of the input image. Generally, such coarse mipmaps occupy little space.

In order to effectuate continuous reconstruction across block boundaries, texture mapping component 504 can perform explicit bilinear interpolation in the pixel shader. Typically chart padding by itself does not guarantee continuous inter-block reconstruction, for two reasons: (1) due to epitome instancing, the padded samples cannot match all the blocks that they may be adjacent to in the reconstructed image; and (2) in the presence of affine deformations, the sample positions may not align geometrically at the block boundaries (e.g., much like in surface texture aliases). Accordingly to overcome this shortcoming, texture mapping component 504 can guarantee continuous reconstruction by performing explicit bilinear interpolation in the pixel shader. In order to accomplish this, for instance, texture mapping component 504 can access the 4 closest samples separately through the transform map (e.g., possibly mapping to non-adjacent blocks), and bilinearly blending these sample values. Thus, sampling near the block corners can access up to 4 separate epitome charts. As an optimization however, texture mapping component 504 can simplify the blending operation to consider just the 2 nearest blocks, for example. Nevertheless, such an optimization can, for example, result in a tiny X-shaped discontinuity curve near each block corner, but typically such an X-shaped discontinuity curve is not noticeable in practice.

Many blocks of the reconstructed image I' can contain affinely transformed epitome content. Generally, affine warping can involve sampling (e.g., bilinear sampling), and therefore can introduce a slight amount of blurring. However, images are most often used in texture mapping where similar interpolation also occurs. Therefore it should be noted that the rendering of I provided by texture mapping component 504 typically does not introduce additional resampling, because texture mapping component 504 can, for example, render the image with bilinear filtering directly from the epitome which contains original un-resampled content.

Figure 6:
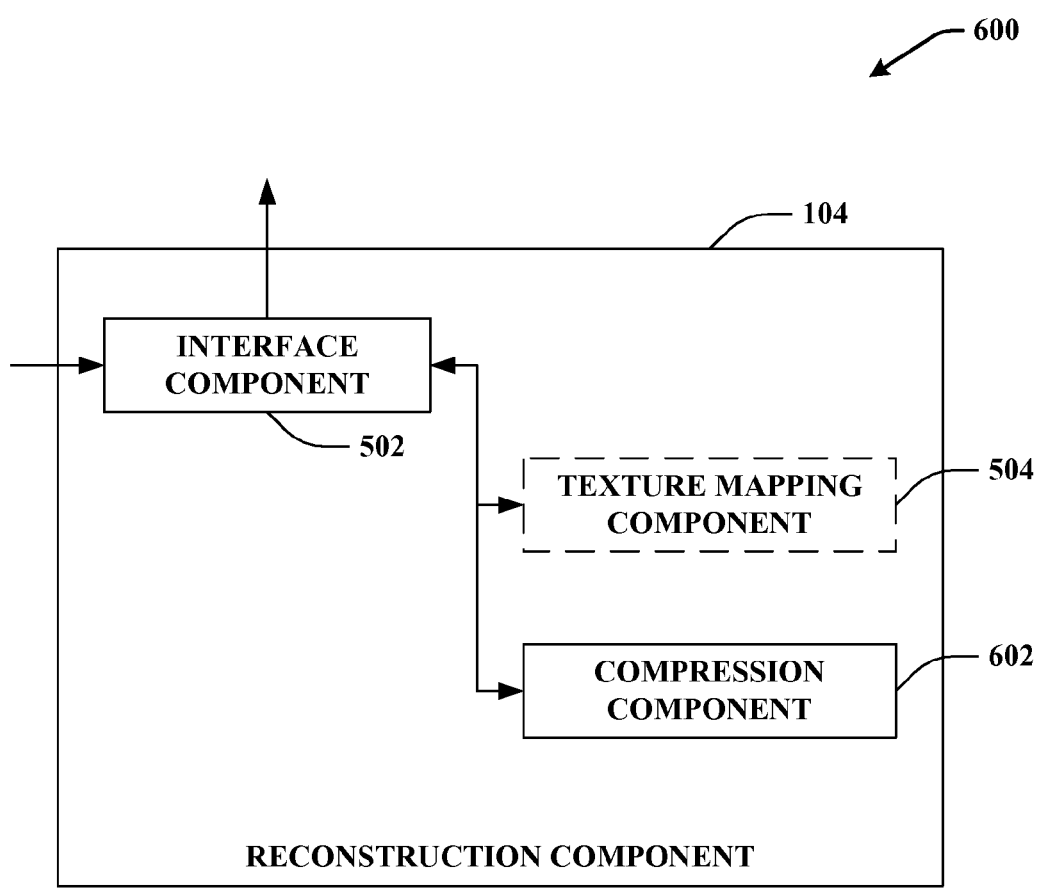
FIG. 6 provides a further detailed illustration of reconstruction component in accordance with an additional and/or alternative aspect of the claimed subject matter.

FIG. 6 provides a further detailed illustration 600 of reconstruction component 104 in accordance with an additional and/or alternative aspect of the claimed subject matter. As depicted reconstruction component 104 can include compression component 602 that can effectuate compression of factored representations (e.g., the epitome aspect (E) and the mapping aspect (ϕ) generated by factor component 102). Compression component 602 can utilize a variety of techniques, such as one or more of a group of image compression algorithms (e.g., DXT1, DXT2, DXT3, DXT4, DXT5) for random-access rendering, and/or Portable Network Graphics (PNG) file format or Joint Photographic Experts Group (JPEG) compression for sequential storage of the epitome aspect (E). Since the transform map 0, compresses well due to its coherence, then if adjacent image blocks access adjacent content in an epitome aspect (E), their associated translation vector $\phi_t$ can typically be identical (e.g., □$\phi_t$=0). With repeating content, adjacent translation vectors often differ by a small multiple (e.g., typically 0 or −1) of the tiling period. With this in mind, compression component 602 can adopt a simple strategy for sequential compression whereby successive differences can be computed for each of the transform coefficients and thereafter entropy coding applied.

Figure 7:
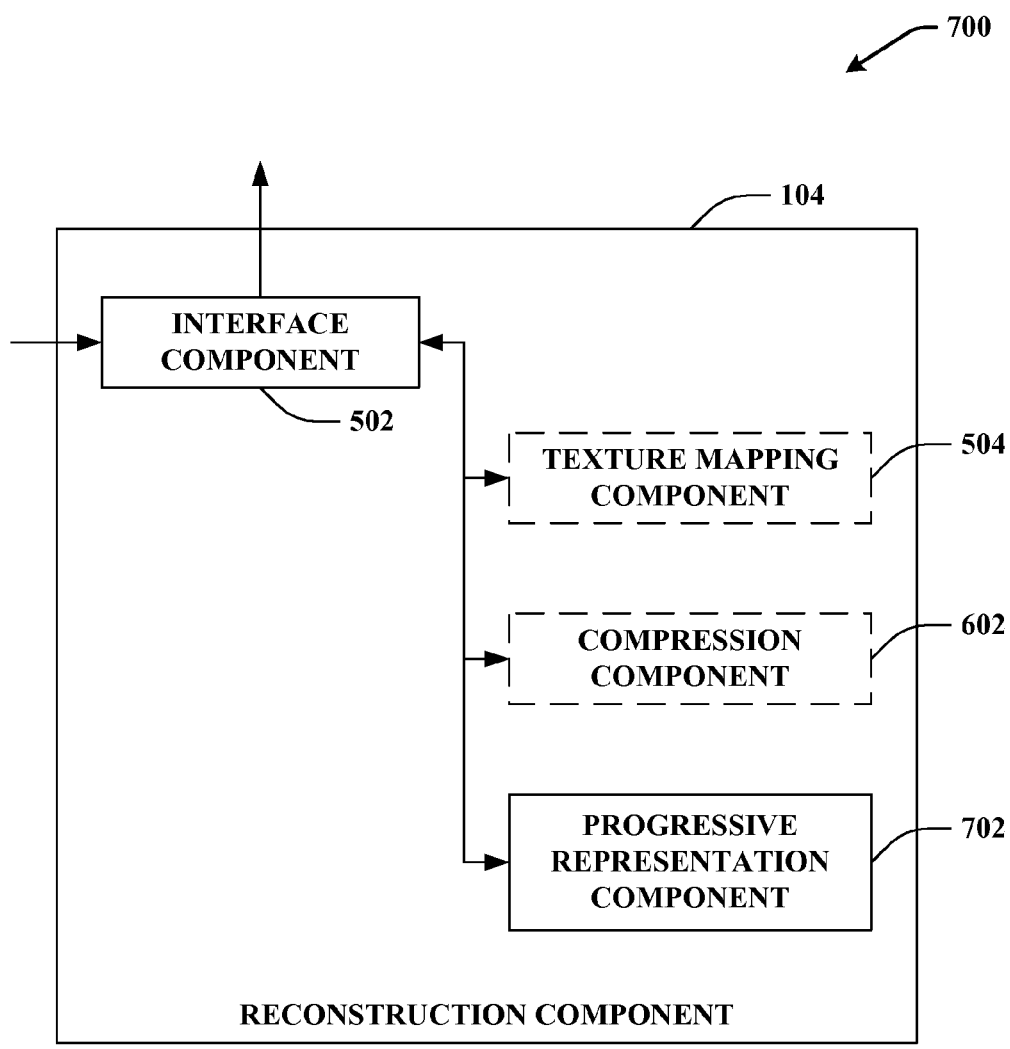
FIG. 7 depicts a further detailed illustration of reconstruction component in accordance with a further and/or alternative aspect of the claimed subject matter.

FIG. 7 depicts a further detailed illustration 700 of reconstruction component 104 in accordance with a further and/or alternative aspect of the claimed subject matter wherein progressive representations can be facilitated and/or effectuated. As depicted reconstruction component 104 can include progressive representation component 702 that creates nested epitome structures to represent increasingly accurate approximations of a given image—a scalable level-of-detailed representation. For example, a rough approximation $I_1$ of image I can be obtained by progressive representation component 702 through use of a small epitome image $E_1$ and initial transform map $\phi_1$. Then a more accurate approximation $I_2$ of image I can be obtained by adding more image content to form a larger epitome image $E_2$ together with the new transform map $\phi_2$. Progressive representation component 702 can then ensure that content in the larger epitome image $E_2$ comprises a superset of the content in image $E_1$ so that only differences between the rough approximation or smaller epitome image and the larger epitome image (e.g., $E_2 \backslash E_1$) need be stored or transmitted. Although the transform maps $\phi_1$ or $\phi_2$ can differ, many the blocks in the larger epitome image $E_2$ can still nevertheless refer to content in the smaller epitome image $E_1$ and therefore their block transforms in the new transform map (e.g., $\phi_2$) affiliated with the larger epitome image $E_2$ can be predicted by progressive representation component 702 from those contained in the transform map (e.g., $\phi_1$) associated with the smaller epitome image El to allow for effective compression.

Without limitation, two illustrative schemes can be employed by progressive representation component 702 for the purposes of progressivity of epitome content. The first approach requires progressive representation component 702 to organize $E_1$ and $E_2 \backslash E_1$ as separate sub images that can be concatenated together to form $E_2$. However a shortcoming of this approach is that the incremental content in $E_2 \backslash E_1$ typically cannot spatially extend the existing epitome charts in $E_1$ since these are already tightly packed. Consequently, in accordance with this aspect, progressive representation component 702 can obtain many new charts in $E_2 \backslash E_1$ whose content overlap significantly with that already in $E_1$.

The second approach that can be adopted by progressive representation component 702 for purposes of progressivity of epitome content lets content in $E_1$ be spatially remapped when forming $E_2$ so that existing charts can be augmented (or partitioned) as needed. Accordingly, progressive representation component 702 can first construct ($\phi_2$, $E_2$) using a small error threshold $\epsilon_2$. Next, progressive representation component 702 can construct a coarser representation ($\phi_1$, $E_1$) using a large error threshold $\epsilon_1$, where epitome content is constrained to be a subset of $E_2$. This constraint can typically be achieved by adaptively removing unnecessary blocks from $E_2$.

While all blocks of $E_1$ can also exist in $E_2$, they generally appear in different locations because $E_1$ and $E_2$ are typically packed independently. Therefore, progressive representation component 702 can form $E_2$ with the help of a remap function $\psi_2$ that can record the destination addresses of the blocks from (a) the previous epitome $E_1$ and (b) the stream of new image blocks $E_2 \backslash E_1$. Since there can be significant spatial coherence in accordance with this aspect, it should be noted that the remap function $\Psi_2$ compresses well.

The overall progressive stream of data emanating from progressive representation component 702 can contain:

$$E_1, \phi_1, E_2 \backslash E_1, \psi_2, \text{diff}(\phi_2, \phi_1), E_3 \backslash E_2, \psi_3, \text{diff}(\phi_3, \phi_2),$$

A progressive representation stream that can be utilized for transmission, or to select a particular content complexity at load time, for example.

Figure 8:
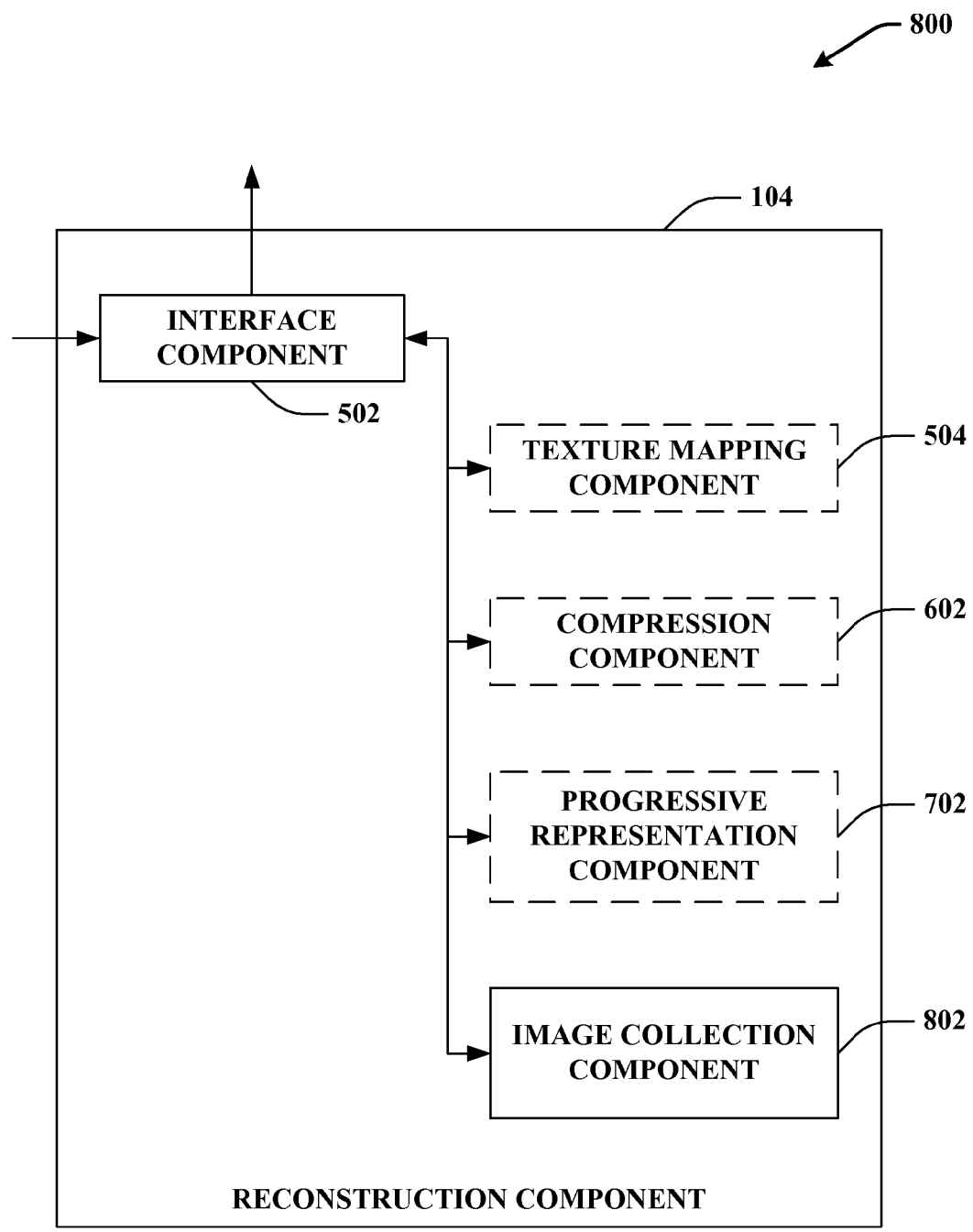
FIG. 8 provides depiction of a further illustrative aspect of reconstruction component in accordance with an aspect of the claimed subject matter.

FIG. 8 provides depiction 800 of a further illustrative aspect of reconstruction component 104 in accordance with an aspect of the claimed subject matter. As illustrated reconstruction component 104 can further include image collection component 802 that, for instance, allows for navigation within a scene using a set of photographs taken from several different viewpoints. For example, if a scene region is diffuse, planar, and unoccluded, its image in one view can be well approximated in a nearby view using local affine deformation and color scaling.

Thus, given a collection of images $\{I_i\}$, image collection component 802 can seek a common epitome E and a set of transform maps $\{\phi_i\}$. Image collection component 802 in seeking a common epitome E can consider as input the concatenation of all the images. Because the input typically is large, image collection component 802 can apply the hierarchical construction algorithms described above in its quest to find the common epitome E and its set of transform maps $\{\phi\}$.

Figure 9:
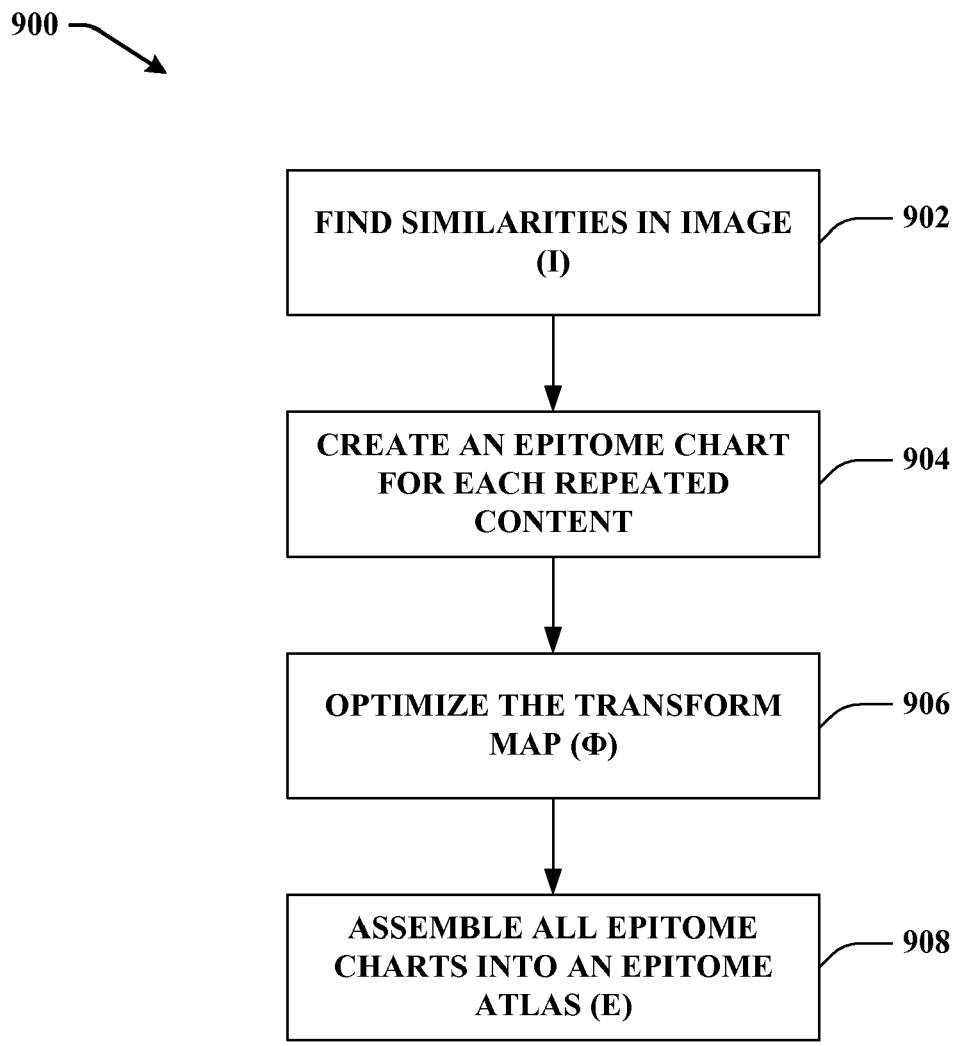
FIG. 9 illustrates a flow diagram of a machine implemented methodology that factors large-scale repeated content within and among images in accordance with an aspect of the claimed subject matter.

In view of the illustrative systems shown and described supra, methodologies that may be implemented in accordance with the disclosed subject matter will be better appreciated with reference to the flow chart of FIG. 9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 9 depicts a machine implement methodology 900 that factors large-scale repeated content within and among images in accordance with an aspect of the claimed subject matter. Method 900 can commence at 902 where similarities in image I can be ascertained wherein for each block in an input image, a set of all transformed regions (patches) in the image with similar content can be computed. At 904 an epitome chart for each of the repeated content can be created wherein contiguous regions (called charts) can be copied from the input image into an epitome E, such that the charts can reconstruct other parts of the image. At 906 the transform map $\phi$ can be optimized. During the incremental growth of the epitome E at 904 each image block can be assigned to a first epitome location that can approximate the first epitome location as well. Nevertheless, because content subsequently added to the epitome can provide even better approximation of the image block, at 906, once epitome construction has completed, the method can iterate through all the image blocks to determine the location in the epitome that offers the best reconstruction of the block and which point the transform map $\phi$ can be updated accordingly. At 908 the created charts can be assembled or packed into an epitome atlas. This packing can be accomplished by considering the set charts in order of decreasing size, and determining for each chart the optimal placement (including rotation and/or mirroring) that minimizes the growth area of a bounding rectangle.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 12:
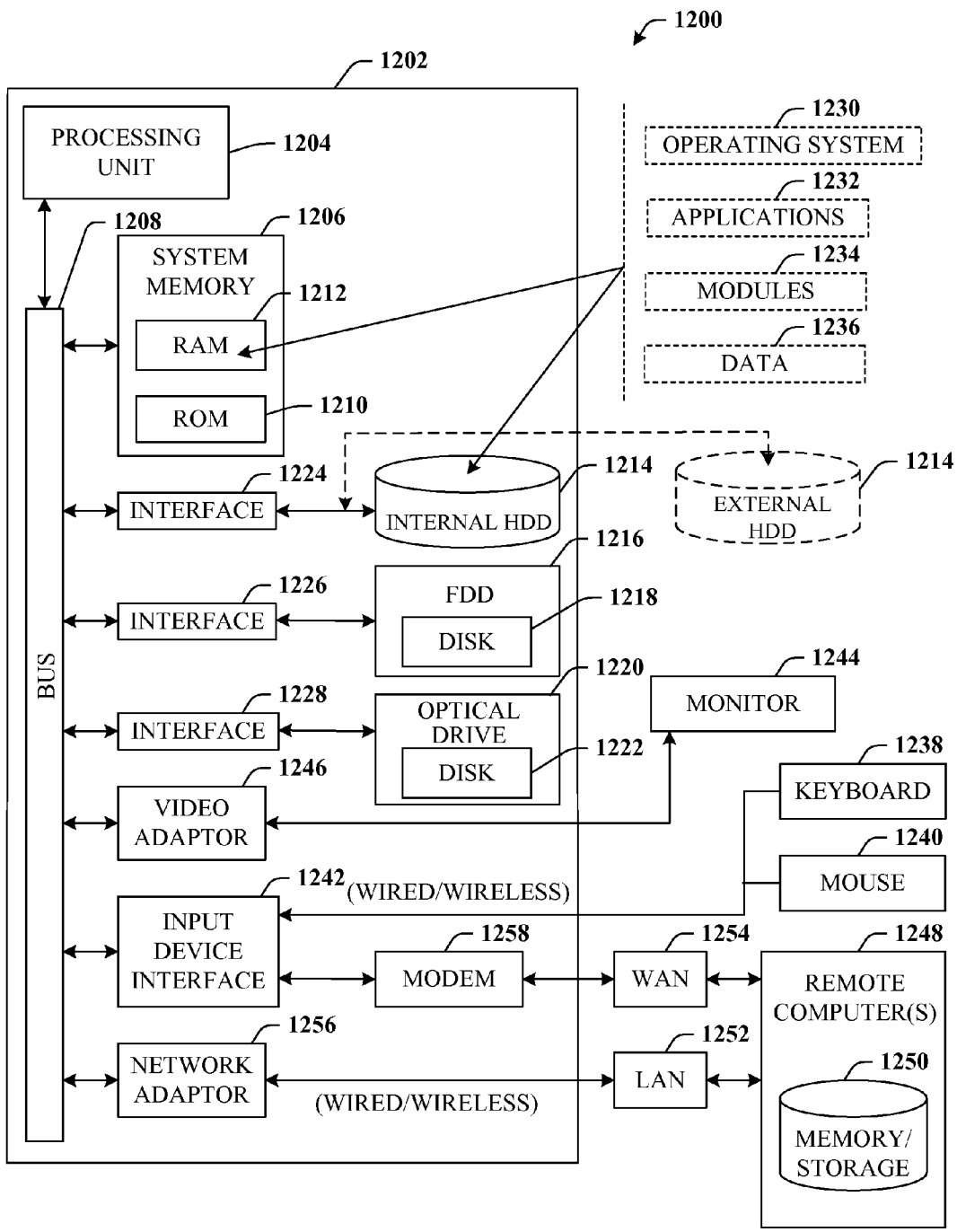
FIG. 12 illustrates a block diagram of a computer operable to execute the disclosed system in accordance with an aspect of the claimed subject matter.

Referring now to FIG. 12, there is illustrated a block diagram of a computer operable to execute the disclosed system. In order to provide additional context for various aspects thereof, FIG. 12 and the following discussion are intended to provide a brief, general description of a suitable computing environment 1200 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro- processor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the illustrative environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the claimed subject matter.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the claimed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1294 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are illustrative and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 13:
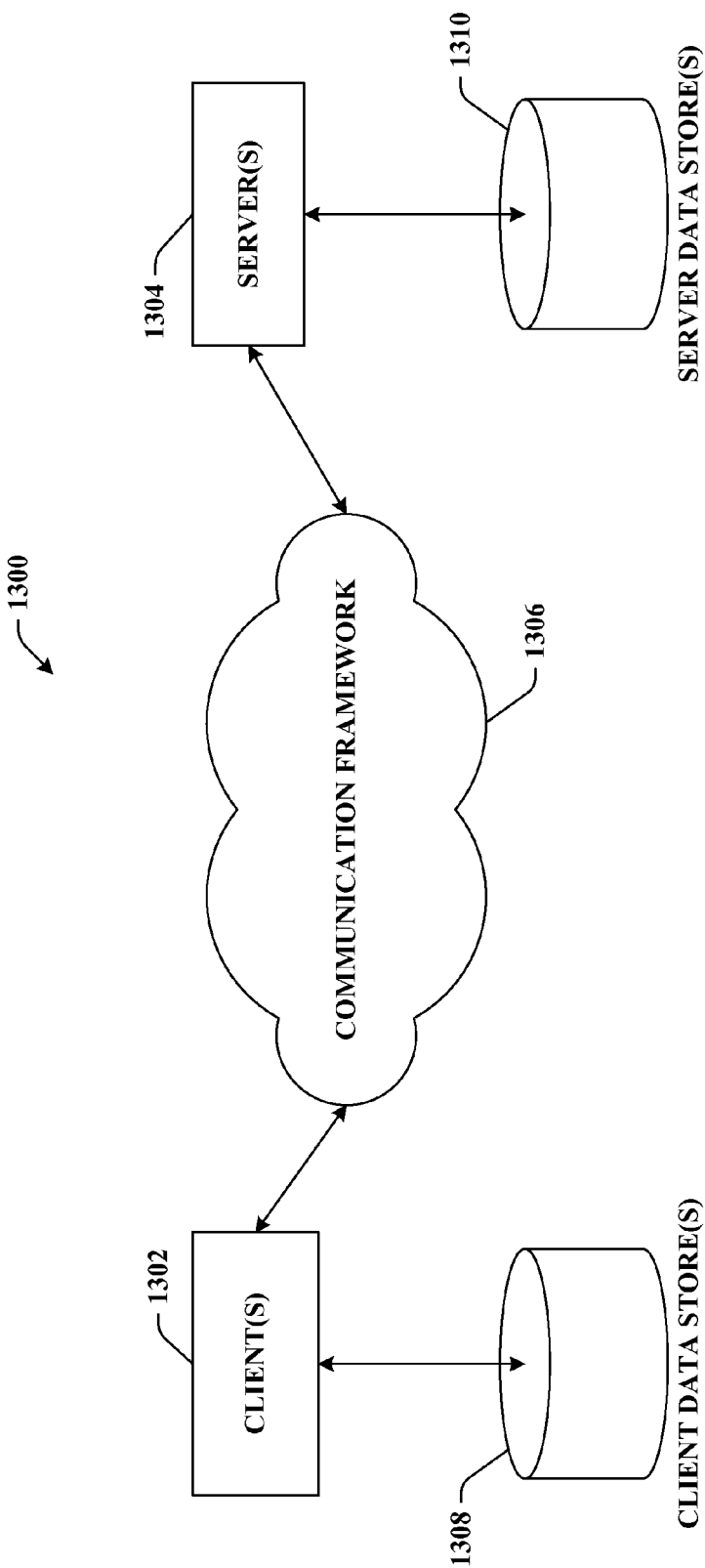
FIG. 13 illustrates a schematic block diagram of an illustrative computing environment for processing the disclosed architecture in accordance with another aspect.

Referring now to FIG. 13, there is illustrated a schematic block diagram of an illustrative computing environment 1300 for processing the disclosed architecture in accordance with another aspect. The system 1300 includes one or more client(s) 1302. The client(s) 1302 can be hardware and/or software (e.g., threads, processes, computing devices). The client(s) 1302 can house cookie(s) and/or associated contextual information by employing the claimed subject matter, for example.

The system 1300 also includes one or more server(s) 1304. The server(s) 1304 can also be hardware and/or software (e.g., threads, processes, computing devices). The servers 1304 can house threads to perform transformations by employing the claimed subject matter, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented method that factors large-scale repeated content within or among images, comprising:
    locating a self similarity in an input image;
    creating an epitome chart for the self similarity;
    optimizing a transform map; and
    assembling the epitome chart into an epitome atlas, the epitome atlas employed to generate and display an output image similar to the input image, the epitome atlas comprising a plurality of epitome charts corresponding to a plurality of self similarities in the input image, the assembling comprising sorting the plurality of epitome charts in order of decreasing size and determining for an epitome chart in the plurality of epitome charts an optimal placement that minimizes a growth in area of a bounding rectangle.

2. The method of claim 1, wherein the locating further comprises computing a set of transformed regions in the input image with similar content, the transformed regions corresponding to regions of the input image that approximate other regions of the input image.

3. The method of claim 2, wherein the computing further comprises employing a tracking optimizer that solves for optimal affine alignment of more than one transformed region.

4. The method of claim 3, wherein the employing further comprises initializing the tracking optimizer at a grid of seed points, the seed points identified through utilization of neighborhood color histograms similar, within a predefined similarity threshold, to a queried transformed region.

5. The method of claim 1, wherein the creating further comprises copying contiguous regions from the input image into an epitome chart, the contiguous regions utilized to reconstruct other parts of the input image.

6. The method of claim 1, wherein the optimizing further comprises dividing the input image into blocks, iterating through the blocks of the input image, and determining a location in an epitome chart that represents a best reconstruction of a block of the input image.

7. One or more computer-readable storage media comprising computer-readable instructions that, when executed by one or more processors, configure the one or more processors to perform acts comprising:
    locating a self similarity in an input image based at least in part on initializing a tracking optimizer at a grid of seed points to solve for an optimal affine alignment of more than one transformed region of the input image with similar content, the seed points identified through utilization of neighborhood color histograms similar, within a predefined similarity threshold, to a queried block of the input image;
    creating an epitome chart for the self similarity;
    optimizing a transform map for constructing an output image similar to the input image by selecting transformed regions of the epitome chart; and
    assembling the epitome chart into an epitome atlas comprising a plurality of epitome charts corresponding to a plurality of self similarities in the input image, the epitome atlas employed to generate and display the output image similar to the input image.

8. The one or more computer-readable storage media of claim 7, wherein the creating further comprises copying contiguous regions from the input image into an epitome chart, the contiguous regions utilized to reconstruct other parts of the input image.

9. The one or more computer-readable storage media of claim 7, wherein the optimizing further comprises dividing the input image into blocks, iterating through the blocks of the input image, and determining a location in an epitome chart that represents a best reconstruction of a block of the input image.

10. A system comprising:
    a processor;
    memory coupled to the processor, the memory comprising components including:
        a factor component, executable by the processor, for identifying self similarities in an input image, the factor component generating a plurality of epitome charts comprising an epitome chart for a self similarity identified and optimizing a transform map associated with each epitome chart included in the plurality of epitome charts; and
        an assembly component, executable by the processor, for aggregating the plurality of epitome charts into an epitome atlas, the assembly component sorting the plurality of epitome charts in order of decreasing size and determining for an epitome chart in the plurality of epitome charts an optimal placement that minimizes a growth in area of a bounding rectangle.

11. The system of claim 10, wherein the memory further comprises components including:
    a reconstruction component, executable by the processor, for generating and displaying an output image based at least in part on the epitome atlas.

* * * * *